2,288,639

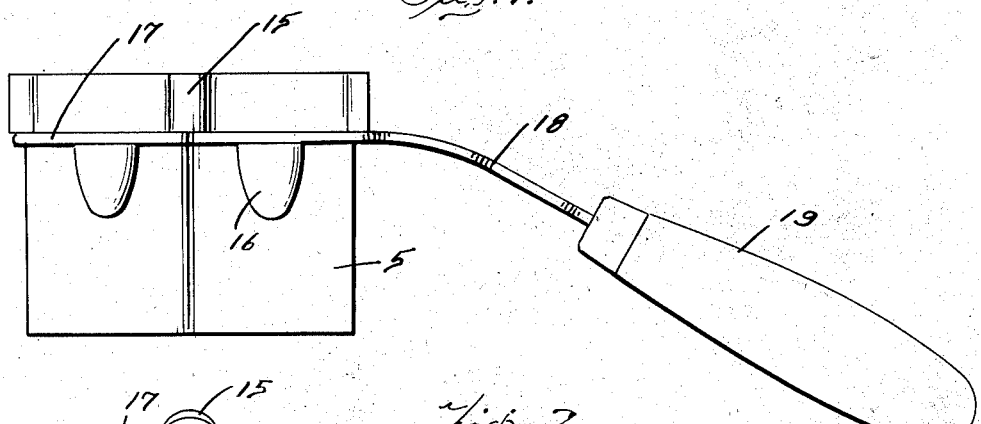
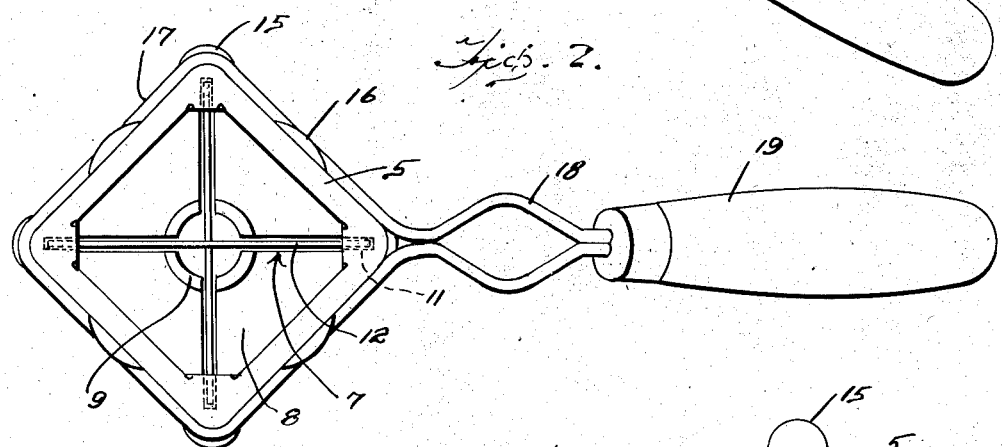
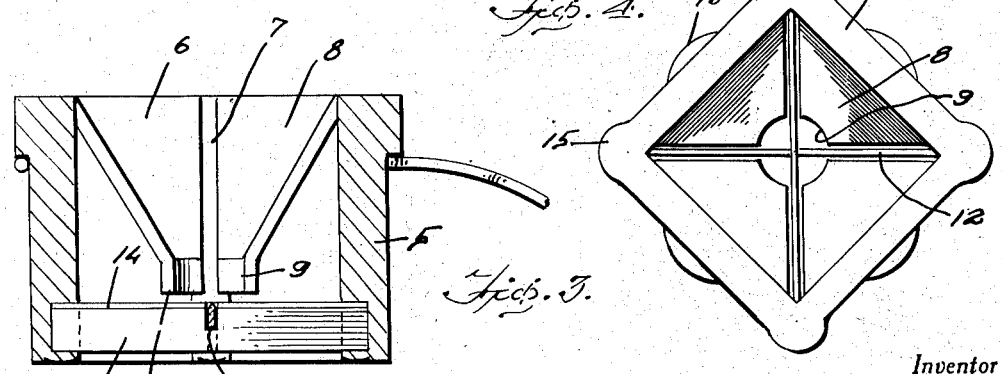
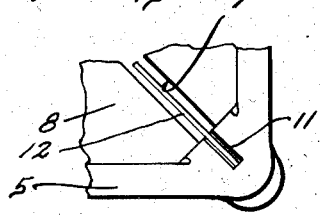
Inventor
Hill Ogletree
By *Clarence A. O'Brien*
Attorney Patented July 7, 1942

UNITED STATES PATENT OFFICE 2,288,639

CUTTING IMPLEMENT

Hill Ogletree, Austin, Tex.

Application January 18, 1941, Serial No. 375,070

3 Claims. (Cl. 146—171)

The present invention relates to new and useful improvements in cutting implements and more particularly to a cutter especially adapted for slitting beans and particularly string beans.

The invention has for its principal object to provide a cutter with which string beans can be engaged and slit longitudinally, thus preparing the beans in a manner whereby they can be cooked more thoroughly and satisfactorily in a shorter period of time.

An important object of the invention is to provide a cutting implement of this character which can be easily handled without danger to the operator.

An additional object is to provide a cutting implement of this character embodying a one piece tubular body portion formed of plastic material having a funnel-shaped guideway into which the beans are fed for engaging the blade positioned in the body immediately beneath said funnel.

A still further object is to provide novel means for securing the blades or knives in position in the plastic body.

It is also an object of the present invention to provide novel means for attaching a handle to the body of the device.

A further object is to provide a device of this character of simple and practical construction, which is neat and attractive in appearance, relatively inexpensive to manufacture and assembled with a minimum of effort and time, and otherwise well adapted for the purposes for which the same is intended.

Other objects and advantages reside in the details of construction as more fully hereinafter described and claimed, reference being had to the accompanying drawing forming part hereof, wherein like numerals refer to like parts throughout, and in which—

Figure 1 is a side elevational view,

Figure 2 is a bottom plan view,

Figure 3 is a longitudinal sectional view,

Figure 4 is a top plan view, and

Figure 5 is a fragmentary bottom plan view of one corner of the body showing the slot formed therein for receiving one end of the cutter.

Referring now to the drawing in detail, the numeral 5 designates the tubular body of plastic material capable of being liquefied or melted when subjected to a predetermined heat, and preferably of square shape in cross section, one end of the body having an inwardly projecting funnel integrally formed therewith, the funnel being split longitudinally as shown at 7 extending from each corner of the body to provide a plurality of segments 8, each of which are adapted to yield slightly at their inner lower end to compensate for beans of different diameters passing through the mouth portion of the funnel. The inner ends of the segments 8 are of arcuate form as shown at 9 and cooperate to form an axially extending mouth 10 through which the beans may be inserted.

The lower edge of the body, at each corner thereof, is formed with an inwardly extending notch 11 adapted to receive the end portion of the cutters 12, the cutters being arranged in crossed relation and immediately below the slots 7 of the funnel. The cutters 12 at their point of crossing are notched as shown at 13, to position the cutting edges 14 of the blade in a common plane immediately beneath the mouth 10, as shown to advantage in Figure 3 of the drawing.

After the end portions of the blades have been inserted in the notches 11 the material of the body at each side of the notches is fused or melted so that the melted material will flow over the back of the end portion of the blades thereby closing the notches and sealing the blades in position therein.

Each corner of the body 5, adjacent its upper edge, is formed with a rounded shoulder 15 and on each of the outer side walls of the body is formed a lug 16 having its upper edge terminating in a plane slightly below the lower edge of the shoulder 15 whereby to receive a wire loop 17 between the upper edge of the lug 16 and the lower edge of the shoulder 15, the loop completely surrounding the body 5 as shown to advantage in Figure 2 of the drawing, and has its end portions 18 projecting outwardly from one corner of the body for attaching to a handle 19, the wire loop thus serving as a carrier for the body of the implement and the shoulders 15 and lugs 16 cooperate to secure the loop in position thereon against accidental displacement.

From the foregoing it will be apparent that upon the insertion of the beans into the funnel 6, that the engagement thereof by the blades or cutters 12 will serve to slit the beans into four longitudinal segments of substantially equal size.

It is believed the details of construction, advantages and manner of use of the device will be readily understood from the foregoing without further detailed explanation.

Having thus described the invention, what I claim is—

1. A cutting implement of the class described comprising a hollow body of a plastic composition open at its top and bottom, an integrally formed resilient guide extending inwardly from one end of the body, a transversely positioned blade secured in the body below the guide, vertically offset lugs on the outer surface of the body and a wire handle including a loop surrounding the body and positioned between the lugs to secure the handle against movement on the body.

2. A cutting implement of the class described comprising a hollow body of a fusible plastic composition open at its top and bottom, a resilient guide extending inwardly from one end of the body, notches in said body and a blade having its opposite ends sealed in said notches and disposed in the path of objects passing through the guide.

3. A cutting implement of the class described comprising a hollow body of a fusible plastic composition open at its top and bottom, a resilient guide extending inwardly from one end of the body, notches in said body, and a blade having its opposite ends positioned in said notches, said notches having their edge portions fused over the blade to anchor the blade in the body.

HILL OGLETREE.